United States Patent

Snyder

[15] 3,640,207
[45] Feb. 8, 1972

[54] AUTOMATIC BAKING OVEN FOR PRETZELS

[72] Inventor: George E. Snyder, 539 West Howard St., Hagerstown, Md. 21747

[22] Filed: Oct. 27, 1969

[21] Appl. No.: 869,590

[52] U.S. Cl. ................................................................99/327
[51] Int. Cl. .........................................................A47j 27/62
[58] Field of Search....................99/327, 324, 325, 326, 329, 99/238.1, 238.2, 238.3, 337, 338, 339, 357, 341, 425, 443, 25, 26; 126/14, 17.18–19, 33–39, 41

[56] References Cited

UNITED STATES PATENTS

| | | | |
|---|---|---|---|
| 1,495,862 | 5/1924 | Meacham | 126/19 M UX |
| 1,771,762 | 7/1930 | Allwine | 99/341 X |
| 2,600,760 | 6/1952 | Guffey | 99/443 R X |
| 2,633,840 | 4/1953 | Crawford | 99/339 UX |
| 2,634,749 | 4/1953 | Cone | 99/339 UX |
| 2,953,080 | 9/1960 | Gartner et al. | 99/357 X |
| 3,038,986 | 6/1962 | Molitor | 126/33 X |
| 3,090,294 | 5/1963 | Rodman | 99/341 X |
| 3,267,924 | 8/1966 | Payne | 126/41 |
| 3,391,633 | 7/1968 | Boosalis | 99/341 X |

Primary Examiner—Robert W. Jenkins
Assistant Examiner—Arthur O. Henderson
Attorney—Pattison, Wright & Pattison

[57] ABSTRACT

A merchandising pretzel baking oven has a vertical casing defined by a lower rigid wall portion and an upper transparent wall display case with a horizontal partition wall therebetween. The lower portion has a baking chamber constituted by upper and lower sections of truncated rectangular base pyramidal shape horizontally fixed therein with timer controlled electrical heating rods mounted at the closed top wall of the upper section and at the open bottom wall of the lower chamber. A baking tray adapted to contain frozen pretzels is slidably supported by the lower portion and is movable into and from the oven chamber horizontally intermediate the sections thereof through one wall of the lower portion with a cleanout tray, arranged below the oven chamber, being also slidable in such wall. The other walls of the lower portion have combined heat insulating and illuminated advertising display panels provided on their outer faces.

3 Claims, 3 Drawing Figures

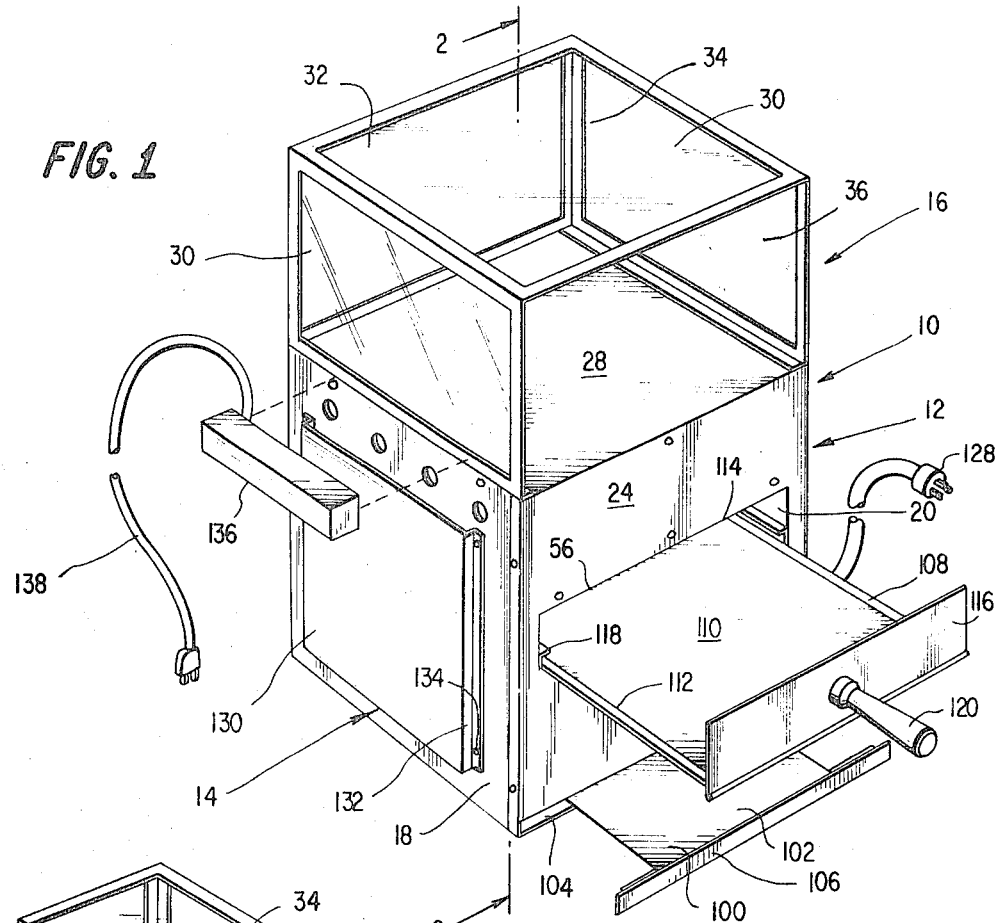
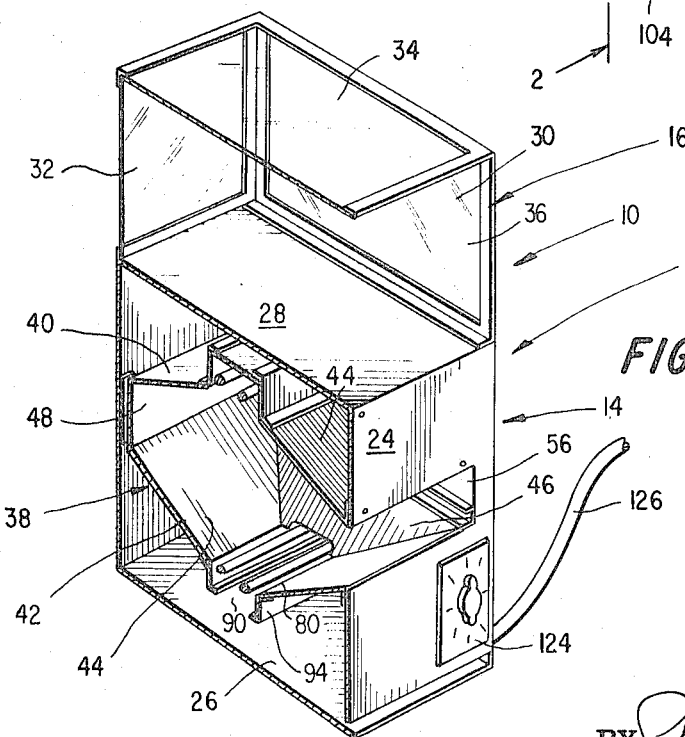

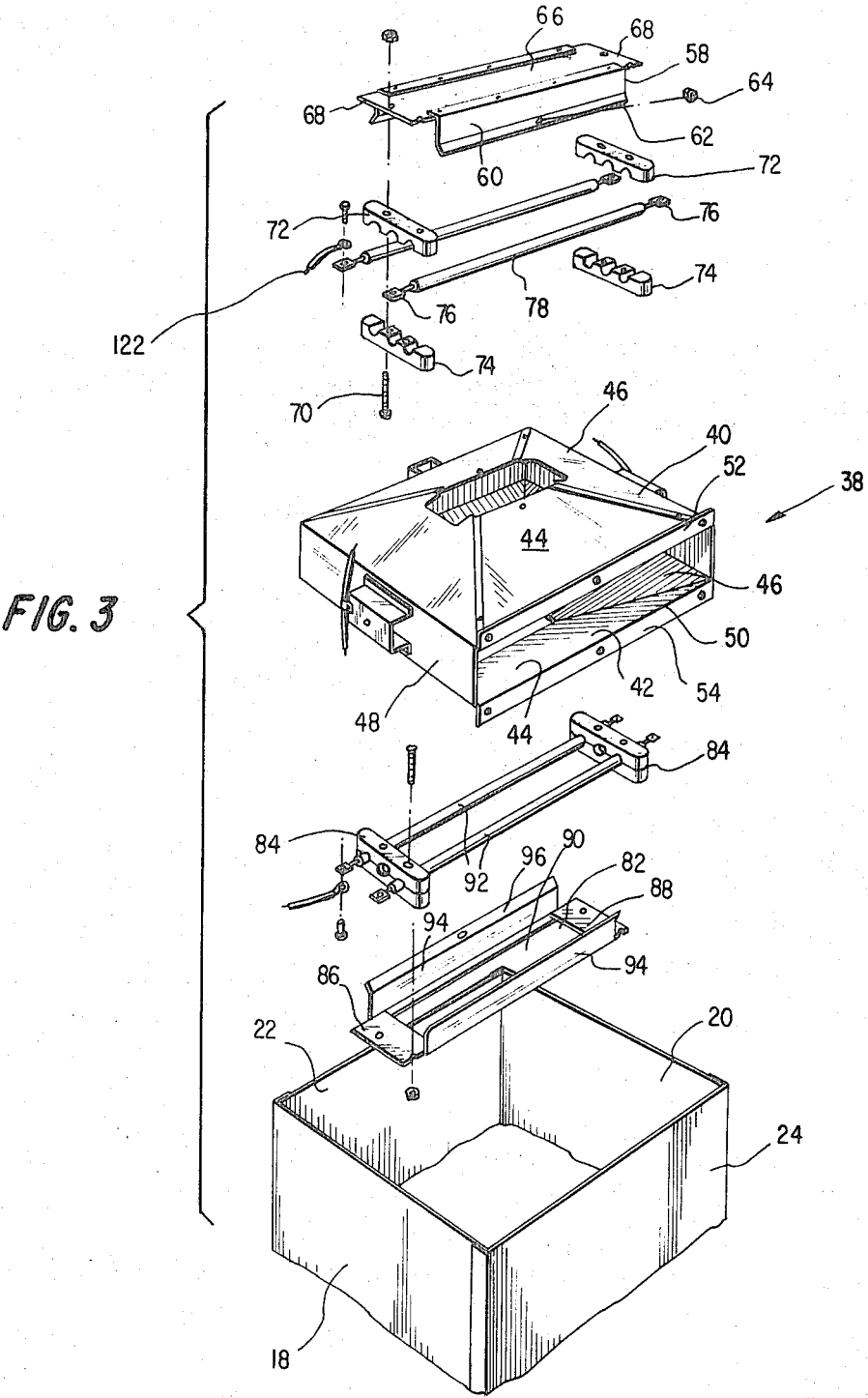

AUTOMATIC BAKING OVEN FOR PRETZELS

BACKGROUND OF THE INVENTION

1. Field of the Invention

The present invention generally appertains to improvements in electric ovens and, more particularly, is directed to new and novel improvements in automatic electric baking ovens for use in the baking and merchandising of eatable snack-type products, particularly such as soft pretzels.

2. Description of the Prior Art

The provision and use of automatic baking ovens for the rapid, on-the-spot, baking and merchandising of eatable snack products to a pedestrian trade in locations such as shopping and amusement stores and centers and athletic or amusement parks has become extremely popular and profitable as our society increases its mobility and finds more outlets for its leisure time. The purchasing public is ever ready for new diversion-type eatables and one product that has become very popular is hot fresh baked soft pretzels. To satisfy this craze, various types of baking ovens have been designed with the baking of frozen pretzels particularly in mind.

In general, such ovens are of the merchandising type in that they serve not only to bake the pretzels at a fast rate but also to display them and offer them for sale in an attractive and appealing manner. The known ovens have oven chambers provided below display case arrangements wherein the baked pretzels are stored in a heated and appealing condition. However, such known oven chambers are very complicated and, consequently, expensive in initial cost and operation, considering the nature of the product and the low prices attendant with sales thereof. Therefore, a need exists for the provision of a dependable, attractive, and efficient merchandising automatic baking oven that is relatively inexpensive but yet which possesses all of the baking and merchandising advantages of known, more expensive baking units. Further, the need for an automatic baking oven which is compact and easily movable to and from locations where it can be placed in immediate and productive operation by merely plugging an electrical cord into any electrical convenience outlet has not been satisfied by the large and complicated conventional oven structures.

SUMMARY OF THE INVENTION

A primary object of the present invention is to provide a compact, attractive, easily portable and very efficient automatic electric baking oven that is designed for the baking and merchandising of snack-type food products, especially soft pretzels.

Generally considered, the pretzel oven of the present invention comprises a vertical, relatively thin and compact, casing having a substantially square lower portion provided with a flat top wall that forms the bottom wall for an upper substantially square transparent wall display casing in which the baked pretzels are displayed for convenient and attractive sales appeal. The casing is square in cross section and the lower portion thereof is comprised for flat sheet-type sidewalls that form an enclosure for an oven chamber. The oven chamber is composed of upper and lower complemental sections of truncated rectangular base pyramidal shape with the sections being fixed together by sidewalls or flanges and fixed at such side flanges or walls to the inner faces of the sidewalls for the casing so that the chamber is horizontally fixed within the lower portion of the casing between the sidewalls thereof. One of the sidewalls of the casing lower portion is formed with an opening through which a tray is slidable, the tray being supported on tracks within the oven chamber so that it is positionable horizontally in the chamber at about the center thereof. The tray is adapted to chamber contain frozen pretzels which are baked within the oven chamber by means of electric heating rod units provided at the closed top wall of the upper section and within the open bottom of the lower section. The heating rods are energized by electrical energy conducted by electrical wires from a timer control unit mounted on the exterior of the wall. An electrical cord extends from the timer unit to be plugged into any available electrical convenience outlet. A cleanout tray is slidably disposed below the open bottom wall of the oven chamber and is slidable through the same wall of the lower portion, with the cleanout tray collecting crumbs and the like that tend to fall from the baking tray.

The outer faces of the walls for the lower portion, except for the wall having slots to accommodate the sliding trays, are provided with panels that serve as insulating and oven heat protection panels and which also are adapted to carry advertising or other display material. Suitable illuminating means is associated with the panels.

BRIEF DESCRIPTION OF THE DRAWING

FIG. 1 is a perspective showing of the pretzel baking oven with the baking and cleanout trays in a pulled out relation to the lower portion of the casing.

FIG. 2 is a vertical cross-sectional view taken substantially on lines 2—2 of FIG. 1.

FIG. 3 is an exploded perspective view of the oven chamber assembly.

DESCRIPTION OF THE PREFERRED EMBODIMENT

Referring now more particularly to the accompanying drawings, the baking oven generally designated by the reference numeral 10, includes a vertical casing 12 which is composed of a lower portion 14 and an upper portion 16. The lower portion is formed from rigid, thin sheets of metal or plastic that are arranged together and attached at their angularly joining vertical side edges so as to form the opposing sidewalls 18 and 20, the front wall 22 and the backwall 24. Such vertical walls are joined by a flat bottom wall 26 and a flat wall 28.

The top wall 28 serves as a partition wall between the upper and lower portions 14 and 16 and also functions as a solid bottom wall for the upper portion 15, which defines a transparent storage and display casing for baked pretzels. The upper portion 16 is constituted by framed transparent sidewalls 30, front wall 32 and top wall 34 with the rear 36 of such upper portion being open or, at best, half open or, at least, provided with a hinged closure door arrangement whereby access to the interior of the upper portion can be easily achieved by an operator standing behind the oven 10.

The lower portion 14 serves as a supporting enclosure for an oven chamber 38 which is made up of upper and lower panel sections 40 and 42, respectively. Such sections are of truncated rectangular base pyramidal shape with each section having sloping sidewalls 44 and sloping end walls 46. The sections are provided with connecting vertical sidewalls or flanges 48 on three sides with one side 50 being open and having upper and lower edge apertured flanges 52 and 54 for mounting the oven chamber on the inside of the rear wall 24 so that the opening is registered with a transverse slot 56 formed in the rear wall, as shown in FIG. 1.

The oven chamber sections provide an oven chamber having upper and lower walls that slope upwardly and downwardly from the four sides to a center portion. In this fashion, the oven chamber 38 functions for maximum reflection of proper distribution of unthermostatically controlled radiant and infrared heat rays arranged in such a manner as to speedily and completely bake frozen pretzels placed in the oven chamber.

The open central top of the upper section 40 of the oven chamber is closed off by the flat face of a channel plate 58, as shown in detail in FIG. 3, with the sides 60 thereof having lateral mounting flanges 62 that are fixed by fasteners 64 to the apertured upper edges of the sidewalls 44 of the upper section 40. The rectangular baseplate 66 of the channel plate 58 has axially extending ends 68 which are apertured to receive fasteners 70 which attach plug-in block insulators 72 and 74 thereto. The insulators are attached in sandwich relation to the extending ends 76 of electrical Calrods 78. Thus, the top of the upper section 40 is defined by the closed wall 58 supporting therebeneath the longitudinally extending parallel heating rods 78 which have their ends clampingly engaged by the insulator blocks 72 and 74.

The lower central portion 80 of the lower section 42 carries a channel plate 82 which supports insulator blocks 84 attached to the end portions 86 of the flat base 88 that has an elongated opening 90 between the end portions and under the Calrods 92 that extend in parallel relation longitudinally thereabove. The sides 94 of the channel plate have lateral mounting flanges 96 on the longitudinal free edges thereof with the flanges 96 being fixed to the sidewalls of the lower section. The channel plates 58 and 82 define rectangular base top and bottom walls of the sectional oven chamber with the top plate being closed while the bottom plate is open so as to permit crumbs and the like to gravitate freely from the interior of the oven chamber.

A cleanout tray 100 is slidably disposed below the oven chamber, as shown in FIG. 1.

The channel plates 58 and 82 define rectangular base top and bottom walls of the truncated pyramidal-shape sections of the oven chamber 38, with the top plate being closed to complement the closed side and top walls of the upper oven section 40 while the bottom plate is open to define a fallout opening for the oven chamber so as to permit crumbs and the like to gravitate freely from the interior of the oven chamber.

A cleanout tray 100 is slidably disposed below the oven chamber as shown in FIG. 1. The tray 100 comprises a flat plate 102 which is slidably disposed within a narrow slot 104 formed transversely at the lower edge of the rear wall 24 of the lower portion 14. The plate 102 is adapted to slide on the upper face of the bottom wall 26 and is formed on its outer edge with a vertical flange 106 that is adapted to close off the slot 104 when the tray is in its normal inserted position within the lower portion 14.

A baking tray 108, which is composed of a flat plate 110 having reinforced side edges 112, is slidably disposed within an opening 114 formed in the rear wall above the slot 104 and in registry with the oven chamber opening 50. The tray plate 110 has a vertical upstanding flange 116 provided transversely on its outer edge and adapted to close off the opening 114. The reinforced side edges 112 constitute rails which are slidably disposed in channel tracks 118 fixed in opposing relation on the sidewalls 18 and 20 and positioned so that the plate bisects the oven chamber, as can be appreciated from a consideration of FIG. 2 and its showing of one of the tracks 118 in relation to the oven chamber. A handle 120 projects outwardly from the vertical end wall 116 so as to enable the tray to be easily moved inwardly and outwardly. The tray will slide easily in the tracks and the upper surface thereof is adapted to contain a number of frozen pretzels placed thereon in any random arrangement.

The electrical heating rods 78 and 92 are energized by electrical conductors 122 which are coupled to an automatic timer 124 from which an electrical cord 126 projects, the cord terminating in a conventional block 128 which can be inserted into any electrical outlet. The timer control unit 124 is of conventional construction and controls the flow of electrical power to the heating rods so that it can be set for any desired number of operating minutes and will automatically shut itself off.

It can be appreciated that the frozen pretzels are easily placed on the upper surface of the baking tray when it is pulled out from the lower portion, as shown in FIG. 1. The loaded tray is then slid inwardly and the vertical wall 116 complements the entire oven chamber closure. The timer control 124 is set and the heating rods are activated for a predetermined period of time to bake the pretzels, such baking being accomplished in a matter of a few minutes. When the pretzels have been baked, the tray 110 is pulled rearwardly and the baked pretzels can be immediately sold or placed in the display casing on top of the oven chamber. In connection with the merchandising and displaying of the pretzels, the outer faces of the opposing side and front walls of the lower portion are provided with panels 130 as shown in FIG. 1, such panels having vertical side edges provided with angular mounting flanges 132 that are secured by fasteners 134 to the walls with the panels 130 serving as oven heating protection on three sides of the oven casing and also providing means for advertising display sheets, boards and the like. Thus, such display panels 130 serve a dual purpose. Above the display panels flashers 136, as shown in FIG. 1, are adaptably mounted with the flashers containing illuminating means electrically energized through the electrical cord 138.

What is claimed is:

1. A baking oven comprising a vertical casing having a lower portion defined by angularly related vertical walls connected by a horizontal top wall, an oven chamber horizontally disposed in the lower portion, means mounting the oven chamber in position, said oven chamber consisting of upper and lower sections of truncated pyramid form, said upper section having a closed top wall, electrical heating rods mounted beneath said top wall, said lower oven section having an open bottom wall defining an oven fallout opening, said oven chamber having an access means forcing one of the vertical walls, said vertical wall having an opening in registry with the access means, a baking tray, means mounting the baking tray for horizontal sliding movement in said opening, and in the access means, and horizontally bisecting the oven chamber at the center thereof, a cleanout tray slidably underlying the oven chamber, means slidably supporting said cleanout tray for movement through said one wall, heating means in the form of electrical heating rods mounted above said bottom oven wall, and automatic timer control means operatively associated with said upper and lower heating rods.

2. The invention of claim 1 wherein said baking tray has an outer vertical wall adapted to close off the wall opening when the tray is in a fully inserted position within the oven chamber.

3. The invention of claim 1 wherein said casing has an upper portion with the top wall of the lower portion serving as the bottom wall therefor, said upper portion being a transparent enclosure.

* * * * *